(12) United States Patent
Taniguchi et al.

(10) Patent No.: US 7,776,474 B2
(45) Date of Patent: Aug. 17, 2010

(54) NON-AQUEOUS ELECTROLYTE SECONDARY BATTERY

(75) Inventors: Akihiro Taniguchi, Ashiya (JP); Kohei Suzuki, Yao (JP); Shuji Tsutsumi, Ikoma (JP); Mitsuhiro Takeno, Settsu (JP); Kozo Watanabe, Katano (JP); Takashi Takeuchi, Hirakata (JP); Takaya Saito, Utsunomiya (JP)

(73) Assignee: Panasonic Corporation, Osaka (JP)

( * ) Notice: Subject to any disclaimer, the term of this patent is extended or adjusted under 35 U.S.C. 154(b) by 996 days.

(21) Appl. No.: 11/262,927

(22) Filed: Nov. 1, 2005

(65) Prior Publication Data

US 2006/0115730 A1    Jun. 1, 2006

(30) Foreign Application Priority Data

Nov. 30, 2004  (JP) .............................. 2004-345370
Feb. 7, 2005   (JP) .............................. 2005-030441

(51) Int. Cl.
*H01M 4/02* (2006.01)
*H01M 4/58* (2006.01)
*H01M 4/62* (2006.01)
*H01M 4/00* (2006.01)

(52) U.S. Cl. ...................... 429/223; 429/209; 429/217; 429/218.1

(58) Field of Classification Search ................. 429/217
See application file for complete search history.

(56) References Cited

U.S. PATENT DOCUMENTS

2003/0054243 A1*  3/2003  Suzuki et al. ................ 429/188
2004/0076882 A1*  4/2004  Hosoya et al. ............... 429/223

FOREIGN PATENT DOCUMENTS

| JP | 2000-21407 A | 1/2000 |
| JP | 2003-331825 A | 11/2003 |
| KR | 10-2004-0072023 | 8/2004 |

* cited by examiner

*Primary Examiner*—Dah-Wei D Yuan
*Assistant Examiner*—Steven Scully
(74) *Attorney, Agent, or Firm*—McDermott Will & Emery LLP

(57) ABSTRACT

Disclosed is a non-aqueous electrolyte secondary battery having an electrode group in which a positive electrode and a negative electrode are spirally wound with a separator interposed therebetween. The positive electrode contains a positive electrode active material and a binder. The positive electrode active material contains a mixture of two different particulate substances having different average particle sizes. The two different particulate substances are lithium composite metal oxides containing nickel as an essential element. The binder includes fluorocarbon resin and rubber particles. The fluorocarbon resin contains at least a vinylidene fluoride unit. The amount of the rubber particles per 100 parts by weight of the fluorocarbon resin is 1 to 25 parts by weight.

6 Claims, 2 Drawing Sheets

F I G. 1
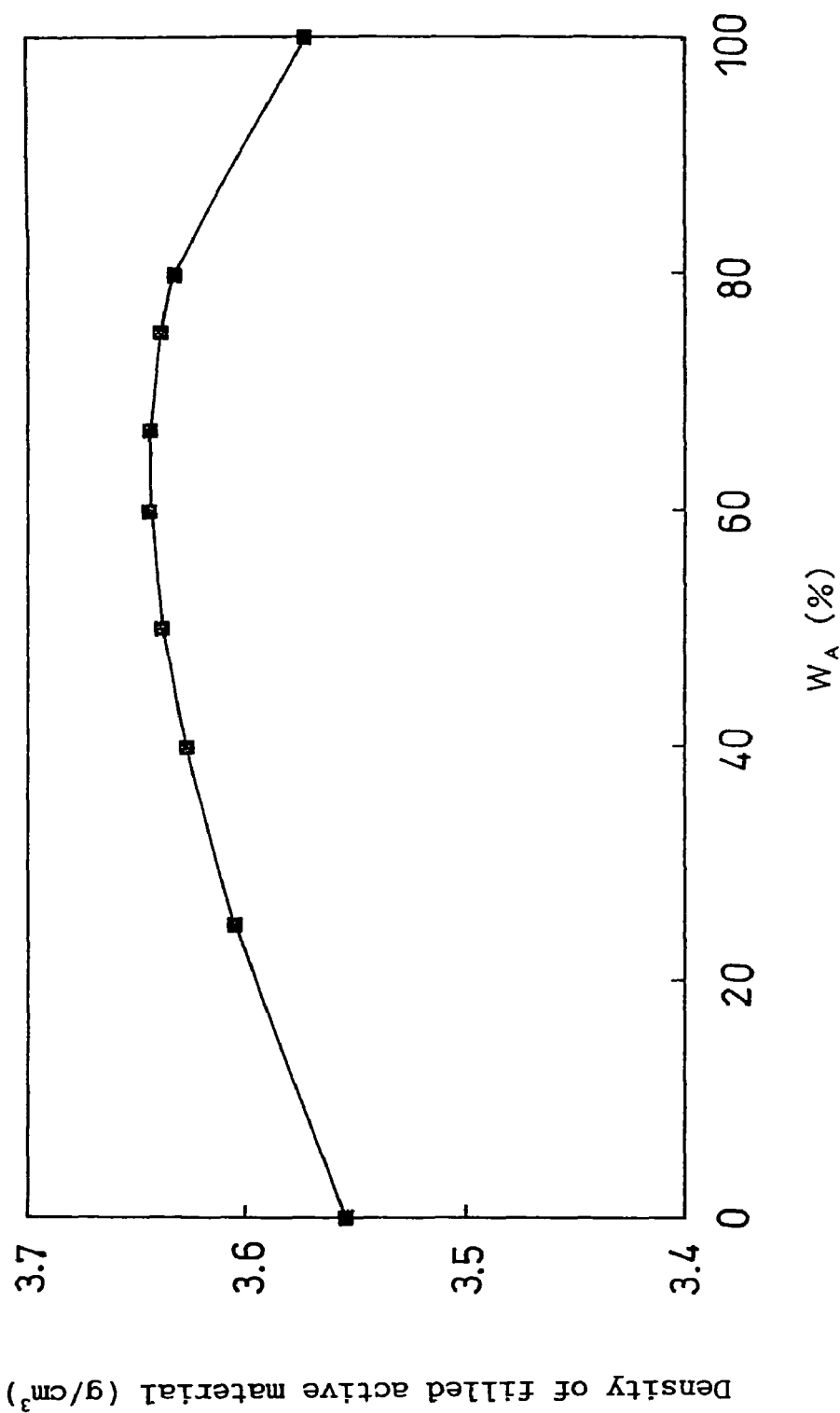

NON-AQUEOUS ELECTROLYTE SECONDARY BATTERY

FIELD OF THE INVENTION

The present invention relates to a high capacity non-aqueous electrolyte secondary battery, particularly to an improvement of flexibility of a positive electrode.

BACKGROUND OF THE INVENTION

With the widespread of smaller and lighter weight electronic equipment such as cell phones and notebook computers in recent years, demand is increasing for higher capacity secondary batteries as the power sources therefor. Hitherto, non-aqueous electrolyte secondary batteries having: a positive electrode containing, as a positive electrode active material, a lithium cobalt oxide such as $LiCoO_2$; and a negative electrode containing a carbon material have been developed and are now widely used.

$LiCoO_2$, however, is very costly because it contains Co. For this reason, various metal oxides are proposed as an alternative to $LiCoO_2$ and are being vigorously studied. Examples of such metal oxides include: lithium composite metal oxides containing nickel as an essential element (hereinafter sometimes referred to as nickel-containing composite oxides) such as $LiNiO_2$ and $LiNi_{1-x}Co_xO_2$ obtained by partially replacing Ni in $LiNiO_2$ with Co; and $LiMn_2O_4$.

Positive electrodes containing a nickel-containing composite oxide as the active material, in particular, can offer a higher energy density than those containing a lithium cobalt oxide as the active material. The use of such positive electrodes, therefore, reduces the cost for producing non-aqueous electrolyte secondary batteries and enhances the capacity of the batteries.

In the production of a positive electrode for secondary batteries, usually, a material mixture slurry is applied on a current collector, followed by drying and rolling to form a positive electrode material mixture layer. The material mixture slurry is prepared by adding a positive electrode active material to a liquid obtained by dissolving or dispersing a binder in an organic solvent, which is then stirred and mixed. As the binder, polyvinylidene fluoride (hereinafter referred to as PVDF), polytetrafluoroethylene and an ethylene-propylene-diene copolymer are usually used. Among them, PVDF is the most suitable material for the binder because it is not easily dissolved in electrolytes and has superior electrolyte retention capability.

Fluorocarbon resin having a vinylidene fluoride unit has low resistance to alkali. It is thus accompanied by a problem that when the material mixture slurry contains an alkali salt, the slurry is gelated to cure the material mixture layer.

Lithium composite metal oxides as typified by $LiCoO_2$ and $LiNiO_2$ usually contain an alkali salt which is introduced therein during the production process. It is difficult to remove such an alkali salt completely. The synthesis of $LiNiO_2$, in particular, requires an excessive amount of alkali salt, the alkali salt is thus likely to remain.

The remaining alkali salt facilitates the gelation of the material mixture slurry as well as helps cure the coating film (i.e., positive electrode material mixture layer). The mechanism of this phenomenon is considered as follows. PVDF first contacts a lithium salt contained in the active material, causing dehydrofluorination (HF) reaction of the PVDF to form a carbon-carbon double bond. Because this double bond is extremely unstable, a crosslinking reaction occurs between or within the molecules of the PVDF. As this reaction proceeds with time, the slurry is gelated or the material mixture layer is cured. If a spirally wound electrode group is produced using a positive electrode having the cured material mixture layer, a crack occurs in the material mixture layer during the spiral winding process, which might break the positive electrode.

In order to prevent the positive electrode material mixture layer from curing, partial replacement of PVDF with a rubber-like acrylic copolymer (preferably in an amount of 45 wt % or more) is proposed (see e.g., Japanese Laid-Open Patent Publication No. 2000-21407). The acrylic copolymer for use is, for example, a copolymer of styrene-butadiene rubber (SBR) added with methyl methacrylate, itaconic acid or acrylonitrile unit. In order to improve the flexibility of a positive electrode plate, Japanese Laid-Open Patent Publication No. 2003-331825 proposes to use a PVDF derivative and rubber particles at a weight ratio of 1:3 to 3:1 as the binder.

DISCLOSURE OF THE INVENTION

It is generally accepted that lithium composite metal oxides containing nickel as an essential element (nickel-containing composite oxides) have low powder flowability. Accordingly, positive electrodes produced using such nickel-containing composite oxides as the active material tend to have poor flexibility. For this reason, there is a need to improve the powder flowability of the active material by using a mixture of two different nickel-containing composite oxides having different average particle sizes.

As disclosed in Japanese Laid-Open Patent Publications Nos. 2000-21407 and 2003-331825, the use of rubber particles as a binder improves the flexibility of positive electrode material mixture layer and prevents the positive electrode material mixture layer from curing. However, the material mixture layer containing an excessive amount of rubber particles separates from the current collector during the production of an electrode group.

The present inventors have discovered that, as a crosslinking reaction proceeds between or within the molecules of fluorocarbon resin containing a vinylidene fluoride unit, polar groups are attached to the fluorocarbon resin, whereby the binding capability of the fluorocarbon resin itself becomes stronger than that of rubber particles. They have also discovered that with adjustment of the weight ratio of rubber particles to fluorocarbon resin containing a vinylidene fluoride unit, the degree of crosslinking in the fluorocarbon resin can be controlled in an appropriate range, and at the same time, satisfactory adhesion of a positive electrode material mixture layer with a current collector can be ensured even during the production of an electrode group.

Based on the above findings, the present invention has been accomplished to ensure both flexibility of the positive electrode and adhesion of the positive electrode material mixture layer to the current collector. In order to attain a high capacity non-aqueous electrolyte secondary battery, the positive electrode active material comprises two different particulate substances having different average particle sizes. Each of the two different particulate substances comprises a lithium composite metal oxide containing nickel as an essential element.

More specifically, the present invention relates to a non-aqueous electrolyte secondary battery comprising an electrode group in which a positive electrode and a negative electrode are spirally wound with a separator interposed therebetween, the positive electrode comprising a positive electrode active material and a binder, the positive electrode active material comprising a mixture composed of two different particulate substances having different average particle sizes, the two different particulate substances each comprising a lithium composite metal oxide containing nickel as an essential element, the binder comprising a fluorocarbon resin and rubber particles, and the fluorocarbon resin comprising at least a vinylidene fluoride unit, wherein the amount of the rubber particles per 100 parts by weight of the fluorocarbon resin is 1 to 25 parts by weight.

It is preferred that the mixture of two different particulate substances comprise a particulate substance A having an average particle size of 10 μm to 20 μm and a particulate substance B having an average particle size of 3 μm to 10 μm, and that a ratio: $D_A/D_B$ of the average particle size of the particulate substance A ($D_A$) to the average particle size of the particulate substance B ($D_B$) be 1.5 to 7. The weight percentage of the particulate substance A relative to the mixture of the two different particulate substances is preferably 50% to 80%.

The mixture of two different particulate substances may comprise primary particles and secondary particles of the lithium composite metal oxide. For example, a mixture comprising a particulate substance A composed of secondary particles of a lithium composite metal oxide and a particulate substance B composed of primary particles of the lithium composite metal oxide can be used.

Preferably, the rubber particles are core-shell rubber particles containing an acrylonitrile unit. The core-shell rubber particles preferably contain an acrylate unit in the shell. The amount of the fluorocarbon resin is preferably 1 to 3 parts by weight relative to 100 parts by weight of the positive electrode active material.

According to the present invention, it is possible to ensure proper adhesion of the positive electrode material mixture layer to the current collector in a high capacity non-aqueous electrolyte secondary battery having, as a positive electrode active material, a lithium composite metal oxide containing nickel as an essential element. At the same time, it is also possible to ensure satisfactory flexibility of the positive electrode by preventing the positive electrode material mixture layer from curing. This prevents the separation of the positive electrode material mixture layer when the positive electrode and the negative electrode are spirally wound with a separator interposed therebetween to produce an electrode group. Thereby, the quality and productivity of high capacity non-aqueous electrolyte secondary batteries can be enhanced.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWING

FIG. 1 is a graph showing the weight percentage of particulate substance A relative to the mixture of particulate substances A and B versus the density of the filled mixture in a positive electrode material mixture layer.

DETAILED DESCRIPTION OF THE INVENTION

Figure 2:
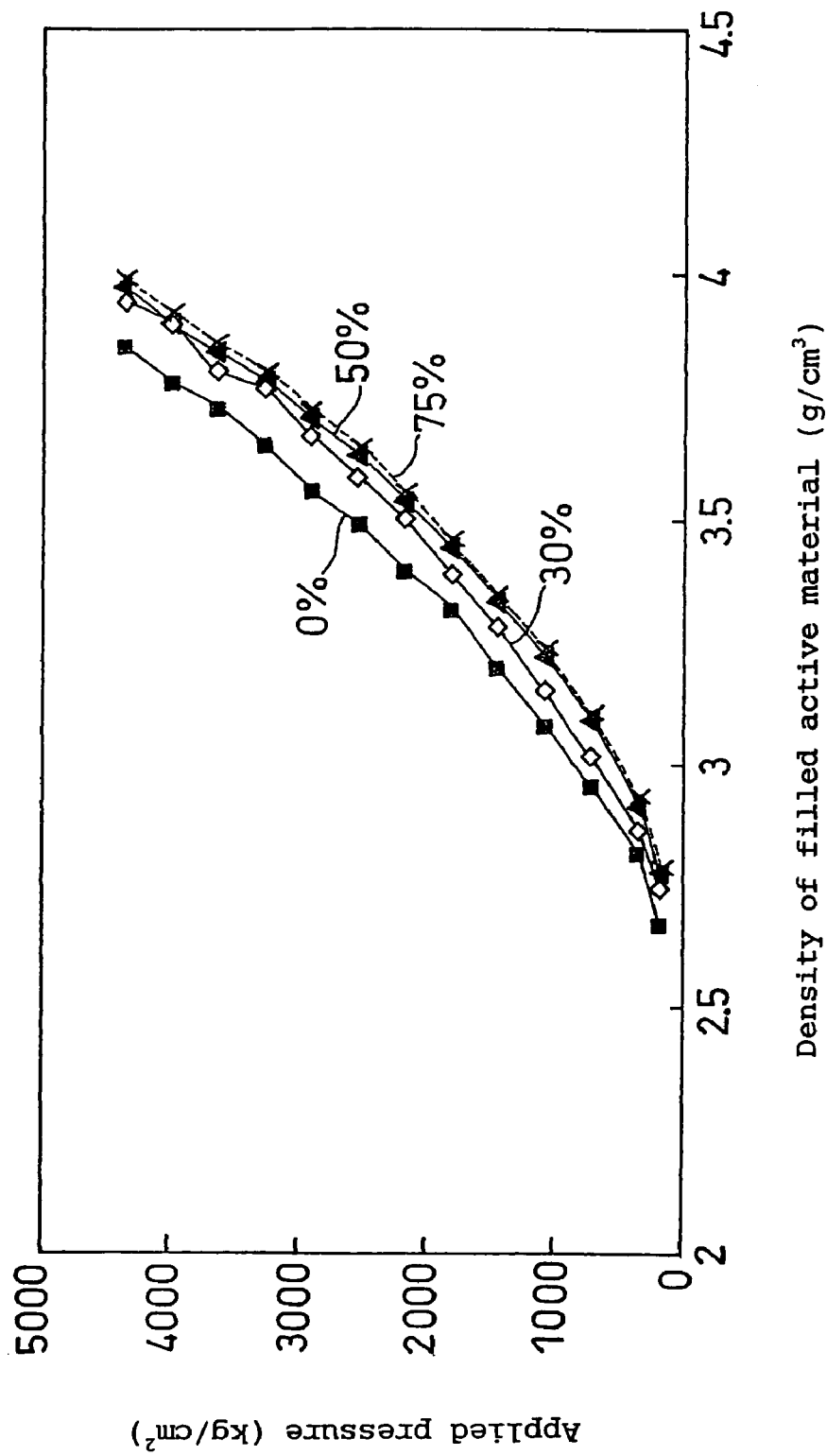
FIG. 2 is a graph showing the density of a mixture of particulate substances A and B when the mixture is filled in a container having a given volume versus the pressure applied to the mixture to achieve the density.

A non-aqueous electrolyte secondary battery of the present invention has an electrode group in which a positive electrode and a negative electrode are spirally wound with a separator interposed therebetween. The electrode group is housed in a battery case having a predetermined shape with a non-aqueous electrolyte. The shape of the battery case is not specifically limited. Usually, the battery case is cylindrical or prismatic. In the case of the battery case being cylindrical, the electrode group is in the form of a cylinder. In the case of the battery case being prismatic, the electrode group is formed such that its transverse cross section is similar to an ellipse.

The positive electrode contains a positive electrode material mixture layer and a positive electrode current collector carrying the positive electrode material mixture layer. The positive electrode current collector is a strip-shaped metal foil, preferably an aluminum foil. The positive electrode material mixture layer is carried on each surface of the positive electrode current collector. It should be understood that the positive electrode current collector has a lead connecting part or a current collecting part, and that the positive electrode material mixture layer is not formed on the lead connecting part or the current collecting part so that the current collector is exposed. In order to achieve a smaller and lighter weight battery, the current collector typically has a thickness of 10 μm to 25 μm. The positive electrode material mixture layer contains a positive electrode active material and a binder. The positive electrode material mixture layer may further contain other component than the positive electrode active material and the binder, such as a conductive material.

The positive electrode active material contains two different particulate substances having different average particle sizes. Whether the positive electrode active material contains two different particulate substances having different average particle sizes or not can be verified by an electron microscope or the like. Further, the two different particulate substances having different average particle sizes can be accurately identified by measuring the particle size distribution of the positive electrode active material. In the particle size distribution of a mixture of two different particulate substances, two peaks are usually observed. By separately analyzing the waveforms in the particle size distribution, the distribution of each particulate substance can be obtained.

The two particulate substances each comprise a lithium composite metal oxide containing nickel as an essential element. Lithium composite metal oxides containing nickel as an essential element have poor powder flowability. However, the powder flowability of the positive electrode active material can be improved by mixing two different particulate substances having different average particle sizes. This reduces a distortion in the positive electrode and prevents the positive electrode from breaking during the process in which the positive electrode and the negative electrode are spirally wound with a separator interposed therebetween to produce an electrode group. The positive electrode active material may further contain a small amount of other particulate substance. In this case, the amount of the substance is preferably less than 10 wt % of the total amount of the active material.

The binder contains a fluorocarbon resin and rubber particles. The fluorocarbon resin contains at least a vinylidene fluoride unit. If the binder contains only a fluorocarbon resin having at least a vinylidene fluoride unit, the positive electrode material mixture layer will be cured to reduce the flexibility of the resulting positive electrode. The positive electrode will thus be broken easily during the production of the electrode group. In contrast, if the binder contains a large amount of rubber particles so as to prevent the positive electrode material mixture layer from curing, the adhesion of the positive electrode material mixture layer to the current collector will be reduced. Inside the positive electrode material mixture layer that is carried at the outer side of the current collector in a spirally-wound electrode group, in particular, the distance between the particles of the active material increases. It is therefore difficult to ensure adhesion by using a binder composed mainly of rubber particles.

In order to control the degree of crosslinking in the fluorocarbon resin in an appropriate range as well as to yield a positive electrode material mixture layer having a good balance of flexibility enough to withstand the spiral winding process and adhesion to the current collector, the weight percentage of the fluorocarbon resin and the rubber particles should be adjusted. When the weight percentage of the fluorocarbon resin and the rubber particles is appropriately adjusted, the crosslinking of the fluorocarbon resin can proceed properly, during which polar groups are attached to the fluorocarbon resin. Thereby, it is possible to ensure sufficient adhesion of the positive electrode material mixture layer to the current collector even if the distance between the active material particles increases in the positive electrode material mixture layer that is carried at the outer side of the current collector in the spirally-wound electrode group.

More specifically, the weight percentage of the rubber particles to the fluorocarbon resin should be 1% to 25%, preferably, 5% to 20%. In other words, it is necessary to use 1 to 25 parts by weight of the rubber particles per 100 parts by weight of the fluorocarbon resin, preferably, 5 to 20 parts by weight. If the weight percentage of the rubber particles exceeds 25%, the percentage of the fluorocarbon resin will be too small, failing to sufficiently facilitate the crosslinking of the fluorocarbon resin. Consequently, the adhesion of the positive electrode material mixture layer to the current collector cannot be ensured during the production of the electrode group. Conversely, if the weigh percentage of the rubber particles is less than 1%, the percentage of the fluorocarbon resin will be too large, excessively facilitating the crosslinking of the fluorocarbon resin. As a result, the positive electrode material mixture layer is cured, making it difficult to prevent the positive electrode from breaking during the spiral winding process, as in the case of the conventional art.

The mixture of two different particulate substances preferably contains a particulate substance A having an average particle size of 10 μm to 20 μm and a particulate substance B having an average particle size of 3 μm to 10 μm, more preferably, a particulate substance A having an average particle size of 10 μm to 12 μm and a particulate substance B having an average particle size of 5 μm to 8 μm. In this case, a ratio: $D_A/D_B$ of the average particle size of the particulate substance A ($D_A$) to the average particle size of the particulate substance B ($D_B$) is preferably 1.5 to 7, more preferably, 2 to 4. The adjustment of the $D_A/D_B$ ratio to 1.5 to 7 makes it easy to ensure high filling rate (highly filled state) of the particulate substances A and B in the positive electrode material mixture layer, whereby the flexibility of the positive electrode material mixture layer is also ensured. Accordingly, even if the positive electrode is spirally wound at a high curvature, it is possible to protect the positive electrode positioned near the core of the electrode group from breaking.

When the $D_A/D_B$ ratio is 1.5 to 7 and the average particle size $D_A$ of the particulate substance A is not less than 10 μm, it is possible to prevent the distance between the particles of the particulate substance A from being excessively small. This prevents the filling rate (filling factor) of the particulate substances A and B in the positive electrode material mixture layer from decreasing, making it easy to ensure the flexibility of the positive electrode. When the average particle size $D_A$ of the particulate substance A is not greater than 20 μm, it is possible to prevent the surface area of the active material from reducing, thereby preventing the deterioration of discharge capability of the battery.

Moreover, when the average particle size of the particulate substance B is not less than 3 μm, the surface area of the active material can be prevented from being excessively large. This prevents the reduction of the adhesion of the material mixture layer resulting from lack of the binder. When the $D_A/D_B$ ratio is 1.5 to 7 and the average particle size of the particulate substance B is not greater than 10 μm, it is possible to easily ensure the powder flowability of the active material and the flexibility of the positive electrode.

The weight percentage of the particulate substance A relative to the total of the particulate substances A and B is preferably 50% to 80%, more preferably, 75% to 80%. When the weight percentage of the particulate substance A is not less than 50% and not greater than 80%, the filling rate of the particulate substances A and B in the positive electrode material mixture layer can be increased. This protects the positive electrode positioned near the core of the electrode group from breaking even when the positive electrode is spirally wound at a high curvature.

FIG. 1 is a graph showing the weight percentage ($W_A$) of the particulate substance A relative to the total of the particulate substances A and B versus the density of the mixture filled in the positive electrode material mixture layer. In this graph, it is assumed that the individual particles are rigid and spherical, and the effect of friction is not taken into consideration. Also, it is assumed that the particles are filled in the positive electrode material mixture layer in an arrangement in which the remaining space would be the smallest. The particulate substance A has an average particle size of 12 μm. The particulate substance B has an average particle size of 5 μm.

As is clear from FIG. 1, the density of the filled active material is the largest when the weight percentage of the particulate substance A relative to the mixture of the particulate substances A and B is 50% to 80%. The density of the filled active material has a correlation with the powder flowability of the active material (i.e., the mixture of the particulate substances A and B). In other words, the powder flowability of the positive electrode active material is the highest when the weight percentage of the particulate substance A relative to the mixture of the particulate substances A and B is 50% to 80%.

FIG. 2 is a graph showing the density of the mixture of the particulate substances A and B when the mixture is filled in a container having a given volume versus the pressure applied to the mixture to achieve the density. The lower the applied pressure to achieve a certain density, the higher the powder flowability of the mixture of the particulate substances A and B. Note that the percentage value attached to each line in the graph represents the weight percentage of the particulate substance A relative to the mixture of the particulate substances A and B. In this graph also, the particulate substance A has an average particle size of 12 μm. The particulate substance B has an average particle size of 5 μm.

It is clear from FIG. 2 that the mixtures having a weight percentage of the particulate substance A of 50% and 75% have high powder flowability because the applied pressure to achieve a certain density is small.

The mixture of two different particulate substances may be a mixture of primary particles and secondary particles of the lithium composite metal oxide. For example, the positive electrode active material may be aggregated particles which will be crushed later during various production processes. The aggregated particles will become a mixture of primary particles and secondary particles in the positive electrode material mixture layer in the produced positive electrode. In this case, the complexity of controlling a plurality of different particulate substances can be avoided.

The lithium composite metal oxide containing nickel as an essential element is usually synthesized by baking a starting material containing substantially spherical nickel hydroxide powders at a high temperature of not less than 900° C. If the aggregated particles are obtained by baking the starting material at a high temperature of not less than 900° C., followed by slow cooling, the binding force between the primary particles will be high. Accordingly, the aggregated particles thus obtained are unlikely to be crushed by an external stress. Such aggregated particles have low powder flowability.

In contrast, if the lithium composite metal oxide containing nickel as an essential element synthesized in the manner as described above is quickly cooled down after the baking, the resulting aggregated particles will be crushed to an appropriate degree during the preparation of the positive electrode material mixture slurry or subsequent processes. In this case, the starting material is preferably nickel hydroxide having a particle size of 3 μm to 30 μm, more preferably, 5 μm to 15 μm. If such lithium composite metal oxide is used as the positive electrode active material, in the resulting positive electrode material mixture layer, two different particulate substances having different particle sizes are mixed to form a mixture of primary particles and secondary particles which serves as the positive electrode active material.

The composition of the lithium composite metal oxide containing nickel as an essential element is not specifically limited. Preferred are $LiNiO_2$ and $Li(Ni-M)O_2$. As used herein, the "(Ni-M)" indicates that Ni is partially replaced with an element M. In the case of $Li(Ni-M)O_2$, the element M is preferably at least one selected from the group consisting of Co, Mn, Al and Mg. Among them, $Li(Ni—Co)O_2$, $Li(Ni—Co—Mg)O_2$, $Li(Ni—Mn)O_2$ and $Li(Ni—Mn—Co)O_2$ are particularly preferred. They may be used singly or in any combination of two or more.

The present invention is particularly effective when the lithium composite metal oxide containing nickel as an essential element contains Ni in an amount of not less than 70 atom % relative to the total of the metal elements except Li.

As for the binder, the fluorocarbon resin containing at least a vinylidene fluoride unit is not specifically limited. Polyvinylidene fluoride (PVDF), a modified form of PVDF and a copolymer of vinylidene fluoride with other monomer can be used. They may be used singly or in any combination of two or more. The monomer for modifying PVDF or other monomer for forming the copolymer can be monochlorotrifluoroethylene, hexafluoropropylene or maleic acid. The amount of the vinylidene fluoride unit contained in the fluorocarbon resin is preferably not less than 70 wt %, more preferably not less than 90 wt %.

The rubber particles are not specifically limited. Preferred examples include styrene-butadiene copolymer (SBR), a modified form of SBR and core-shell rubber particles (e.g., a modified form of SBR in the form of core-shell). They may be used singly or in any combination of two or more. Particularly preferred are core-shell rubber particles containing an acrylonitrile unit. The incorporation of an acrylonitrile unit, for example, in the core enhances the hardness of the core, which is advantageous for the retention of particle shape. Further, by introducing a unit containing a polar group in the shell, high binding capability and resilience can be imparted to the rubber particles. Even a small amount of such core shell rubber particles is sufficient to provide high binding capability. Considering the stability under the positive electrode potential, it is particularly preferred that the shell contain an acrylate unit.

Examples of commercially available core-shell rubber particles include: BM-400B (trade name) containing a styrene unit incorporated in the shell; and BM-500B (trade name) containing an acrylate group incorporated in the shell, both of which are available from ZEON CORPORATION.

The average particle size of the rubber particles is preferably, but not limited to, 0.05 μm to 0.5 μm. When the average particle size is not less than 0.05 μm, the surface of the active material particles is not excessively coated with the rubber particles, which allows the battery reaction to proceed smoothly. When the average particle size is not greater than 0.5 μm, the distance between the active material particles is not excessively widened, which allows easy securing of electron conductivity in the positive electrode.

The amount of the fluorocarbon resin contained in the positive electrode material mixture layer is preferably 1 to 3 parts by weight per 100 parts by weight of the positive electrode active material. As described above, the fluorocarbon resin cannot fully exhibit its binding capability unless the crosslinking proceeds properly. When the crosslinking proceeds excessively, however, the fluorocarbon resin causes the curing of the material mixture layer. For this reason, the amount of the fluorocarbon resin is preferably 1 to 3 parts by weight per 100 parts by weight of the positive electrode active material in order to allow the crosslinking to proceed properly.

The positive electrode active material layer may further contain a conductive material. The conductive material is not specifically limited. A preferred conductive material is carbon black. Examples of the carbon black include acetylene black, furnace black and ketjen black. They may be used singly or in any combination of two or more. Among them, acetylene black and furnace black are preferred. The average particle size of the conductive material is not limited. Preferably, the average particle size of the primary particles is 0.01 μm to 0.1 μm.

A description will now be given of a method for producing a non-aqueous electrolyte secondary battery of the present invention.

(i) First Step (Preparation of Positive Electrode Material Mixture Slurry)

A positive electrode material mixture slurry is prepared which contains the positive electrode active material, the binder (i.e., fluorocarbon resin and rubber particles), the conductive material and a dispersing medium. The dispersing medium is preferably N-methyl-2-pyrrolidone (NMP), but it may be a ketone such as acetone. In the case of using a ketone, the ketone is preferably mixed with NMP.

The amount of the conductive material contained in the positive electrode material mixture slurry is preferably 1 to 3 parts by weight per 100 parts by weight of the positive electrode active material. When the amount of the conductive material is not less than 1 part by weight, the decrease of electron conductivity of the positive electrode is prevented, prolonging the cycle life of the battery. Conversely, when the amount of the conductive material is not greater than 3 parts by weight, the decrease of the battery capacity is prevented.

(ii) Second Step (Production of Positive Electrode)

The positive electrode material mixture slurry is applied onto both surfaces of a current collector which serves as the positive electrode core member, which is then dried and rolled to form positive electrode material mixture layers. The positive electrode plate thus produced is cut into a predetermined size to produce a positive electrode. The total thickness of the current collector and the positive electrode material mixture layers carried on both surfaces of the current collector is usually 80 to 200 μm.

(iii) Third Step (Production of Negative Electrode)

The production method of the negative electrode is not specifically limited. The negative electrode can be produced by a conventional method. For example, a negative electrode material mixture slurry is first prepared which contains a carbon material capable of absorbing and desorbing lithium ions and a binder. Then, the negative electrode material mixture slurry is applied onto both surfaces of a current collector which serves as the negative electrode core member, which is then dried and rolled to form negative electrode material mixture layers. The negative electrode plate thus obtained is cut into a predetermined size to produce a negative electrode. The total thickness of the current collector and the negative electrode material mixture layers carried on both surfaces of the current collector is usually 80 to 200 μm.

As the binder to be added to the negative electrode material mixture, in addition to the above-mentioned SBR and core-shell rubber particles, polyacrylic fine particles can be used. In order to impart better viscosity to the negative electrode material mixture slurry, carboxymethyl cellulose (CMC) or polyethylene oxide may be added to the slurry. The amount of the binder contained in the negative electrode material mixture is preferably 1.5 to 4 parts by weight per 100 parts by weight of the carbon material. The negative electrode current collector is a metal foil such as a copper foil. In order to achieve a smaller and lighter weight battery, the thickness of the negative electrode current collector is usually 8 to 20 μm.

(iv) Fourth Step (Assembly of Battery)

A battery is assembled using the positive electrode, the negative electrode and a non-aqueous electrolyte. First, an electrode group is produced by spirally winding the positive electrode and the negative electrode with a separator interposed therebetween. During this winding process, if the positive and negative electrodes and a separator are spirally wound into a cylinder, an electrode group for a cylindrical battery can be obtained. If the positive and negative electrodes and a separator are spirally wound such that the transverse cross section is similar to an ellipse, an electrode group for a prismatic battery can be obtained. The obtained electrode group is housed in a battery case having a predetermined shape. Into the battery case accommodating the electrode group, a non-aqueous electrolyte is injected. The battery case is then sealed to produce a non-aqueous electrolyte secondary battery.

The separator is preferably a microporous film made of a polyolefin such as polyethylene or polypropylene. The thickness of the separator is usually 10 μm to 40 μm.

The non-aqueous electrolyte is not specifically limited and any conventional electrolyte for non-aqueous electrolyte secondary batteries can be used. Typically, an electrolyte prepared by dissolving a lithium salt in a non-aqueous solvent is preferably used. Examples of the lithium salt include $LiPF_6$ and $LiBF_4$. They may be used singly or in combination of two or more.

Examples of the non-aqueous solvent include ethylene carbonate (EC), propylene carbonate (PC), dimethyl carbonate (DMC), diethyl carbonate (DEC) and ethyl methyl carbonate (EMC). They may be used singly or in any combination of two or more.

The non-aqueous electrolyte may further contain an additive for enhancing resistance to overcharge. A preferred example of the additive is a benzene derivative having a phenyl group and a cyclic compound group adjacent to the phenyl group. Examples of the benzene derivative include biphenyl, cyclohexylbenzene, diphenyl ether and phenyllactone.

Hereinafter, the present invention will be described in more detail with reference to examples. However, it is to be understood that the present invention is not limited thereto.

As used in this specification, the term "average particle size" means a volume based median size ($D_{50}$).

Investigation 1

Investigation was conducted for the case where two different particulate substances having different average particle sizes were used in the preparation of the positive electrode active material.

EXAMPLE 1

(i) Production of Positive Electrode

As the starting material of the positive electrode active material, solid solution nickel hydroxide containing a certain amounts of cobalt and aluminum was used. More specifically, solid solution nickel hydroxide having an average particle size of 7 μm (nickel hydroxide A) and lithium hydroxide were mixed, followed by baking at 950° C. The resulting product was slowly cooled down to 100° C. for 12 hours. Thus, lithium nickel composite oxide secondary particles (composition: $LiNi_{0.8}Co_{0.15}Al_{0.05}O_2$) were obtained. This was designated as particulate substance A. Meanwhile, a particulate substance B was prepared in the same manner as the particulate substance A was produced except that the solid solution nickel hydroxide having an average particle size of 0.3 μm (nickel hydroxide B) was used.

The weight ratio of the particulate substances A and B was A:B=70:30. The particulate substance A had an average particle size of 20 μm. The particulate substance B had an average particle size of 1 μm.

According to the first step described previously, to 100 parts by weight of the positive electrode active material, 2 parts by weight of PVDF and 0.2 parts by weight of core-shell rubber particles containing an acrylonitrile unit and having an acrylate unit incorporated in the shell were added as the binder. Further, to 100 parts by weight of the active material, 2 parts by weight of acetylene black having an average primary particle size of 0.03 μm as the conductive material and a proper amount of NMP as the dispersing medium were added thereto. Thereby, a positive electrode material mixture slurry was prepared.

The PVDF used here was solid content of KF polymer L #7208 (trade name) available from Kureha Chemical Industry Co., Ltd.

The core-shell rubber particles containing an acrylonitrile unit and having an acrylate unit incorporated in the shell used here were solid content of BM-500B (trade name) available from ZEON CORPORATION.

The positive electrode material mixture slurry was applied to both surfaces of a 15 μm thick aluminum foil (current collector), followed by drying and rolling to form positive electrode material mixture layers. The thus-produced electrode plate was cut into a size of 56 mm in width and 610 mm in length (56 mm×610 mm). Thereby, a positive electrode was produced. The positive electrode had a porosity of 20%. The total thickness of the aluminum foil and the positive electrode material mixture layers carried on both surfaces of the aluminum foil was 154 μm.

(ii) Production of Negative Electrode

To 100 parts by weight of spherical natural graphite powder, 1 part by weight of core-shell rubber particles containing an acrylonitrile unit and having a styrene unit incorporated in the shell as the binder and 1 part by weight of carboxymethyl cellulose (CMC) and an appropriate amount of water were added, followed by mixing to prepare a negative electrode material mixture slurry.

The core-shell rubber particles containing an acrylonitrile unit and having a styrene unit incorporated in the shell used here were solid content of BM-400B (trade name) available from ZEON CORPORATION.

The negative electrode material mixture slurry was applied onto both surfaces of a 10 μm thick copper foil (current collector), which was then dried and rolled to form negative electrode material mixture layers. The electrode plate thus obtained was cut into a size of 58 mm in width and 640 mm in length (58 mm×640 mm). Thereby, a negative electrode was produced. The negative electrode had a porosity of 33%. The total thickness of the copper foil and the negative electrode material mixture layers carried on both surfaces of the copper foil was 200 μm.

(iii) Assembly of Battery

The above-produced positive electrode was allowed to sit for one day. Thereafter, using a winding core having an outer diameter of 3 mm, the above-produced positive and negative electrodes were spirally wound with a 20 μm thick polypropylene separator interposed therebetween into a cylinder to produce an electrode group. The electrode group was housed in a bottomed can, after which a non-aqueous electrolyte was injected thereinto. The non-aqueous electrolyte used here was prepared by dissolving $LiPF_6$ in a non-aqueous solvent mixture including ethylene carbonate (EC), dimethyl carbonate (DMC) and ethyl methyl carbonate (EMC) at a volume ratio of 2:2:6 at a $LiPF_6$ concentration of 1 mol/L.

The bottomed can was then sealed, whereby a cylindrical lithium ion secondary battery having an outer diameter of 18 mm and a height of 65 mm was produced (nominal capacity: 2500 mAh). This battery was designated as battery of EXAMPLE 1.

EXAMPLES 2 TO 4

Batteries of EXAMPLEs 2, 3 and 4 were produced in the same manner as in EXAMPLE 1 except that the average particle size of the particulate substance B was changed to 3 μm, 5 μm and 10 μm, respectively, by changing the average particle size of the solid solution nickel hydroxide B to 1 μm, 1.5 μm and 3 μm, respectively.

EXAMPLES 5 TO 7

Batteries of EXAMPLEs 5, 6 and 7 were produced in the same manner as in EXAMPLE 1 except that the average particle size of the particulate substance A was changed to 10 μm by changing the average particle size of the solid solution nickel hydroxide A to 3 μm, and that the average particle size of the particulate substance B was changed to 3 μm, 5 μm and 8 μm, respectively, by changing the average particle size of the solid solution nickel hydroxide B to 1 μm, 1.5 μm and 2.5 μm, respectively.

EXAMPLES 8 AND 9

Batteries of EXAMPLEs 8 and 9 were produced in the same manner as in EXAMPLE 1 except that the average particle size of the particulate substance B was changed to 5 μm by changing the average particle size of the solid solution nickel hydroxide B to 1.5 μm, and that the weight ratio of the particulate substances A and B was respectively changed to A:B=50:50 and 80:20.

EXAMPLES 10 AND 11

Batteries of EXAMPLEs 10 and 11 were produced in the same manner as in EXAMPLE 1 except that the average particle size of the particulate substance B was changed to 5 μm by changing the average particle size of the solid solution nickel hydroxide B to 1.5 μm, and that the weight ratio of the particulate substances A and B was respectively changed to A:B=40:60 and 85:15.

EXAMPLE 12

A battery of EXAMPLE 12 was produced in the same manner as in EXAMPLE 1 except that, instead of the rubber particles of BM-500B, rubber particles of BM-400B (core-shell rubber particles containing an acrylonitrile unit and having a styrene unit incorporated in the shell) were used as the binder for positive electrode, and that the average particle size of the particulate substance B was changed to 5 μm by changing the average particle size of the solid solution nickel hydroxide B to 1.5 μm.

EXAMPLE 13

A battery of EXAMPLE 13 was produced in the same manner as in EXAMPLE 1 except that, instead of the rubber particles of BM-500B, styrene-butadiene rubber (SBR) available under the trade name GRADE 0561 from JSR Corporation was used as the binder for positive electrode, and that the average particle size of the particulate substance B was changed to 5 μm by changing the average particle size of the solid solution nickel hydroxide B to 1.5 μm.

EXAMPLES 14 TO 17

Batteries of EXAMPLEs 14, 15, 16 and 17 were produced in the same manner as in EXAMPLE 1 except that the average particle size of the particulate substance B was changed to 5 μm by changing the average particle size of the solid solution nickel hydroxide B to 1.5 μm, and that the amount of the PVDF was respectively changed to 0.8, 1, 3, and 4 parts by weight per 100 parts by weight of the positive electrode active material.

EXAMPLE 18

A battery of EXAMPLE 18 was produced in the same manner as in EXAMPLE 1 except that the average particle size of the particulate substance B was changed to 5 μm by changing the average particle size of the solid solution nickel hydroxide B to 1.5 μm, and that the amount of the rubber particles (solid content of BM-500B) used as the binder for positive electrode was changed to 0.02 parts by weight per 100 parts by weight of the positive electrode active material.

COMPARATIVE EXAMPLE 1

A battery of COMPARATIVE EXAMPLE 1 was produced in the same manner as in EXAMPLE 1 except that only the particulate substance A was used (i.e., the particulate substance B was not used).

COMPARATIVE EXAMPLE 2

A battery of COMPARATIVE EXAMPLE 2 was produced in the same manner as in EXAMPLE 1 except that the average particle size of the particulate substance B was changed to 5 µm by changing the average particle size of the solid solution nickel hydroxide B to 1.5 µm, and that the amount of the rubber particles (solid content of BM-500B) used as the binder for positive electrode was changed to 0.6 parts by weight per 100 parts by weight of the positive electrode active material.

COMPARATIVE EXAMPLE 3

A battery of COMPARATIVE EXAMPLE 3 was produced in the same manner as in EXAMPLE 1 except that the average particle size of the particulate substance B was changed to 5 µm by changing the average particle size of the solid solution nickel hydroxide B to 1.5 µm, and that the amount of the rubber particles (solid content of BM-500B) used as the binder for positive electrode was changed to 0.01 parts by weight per 100 parts by weight of the positive electrode active material.

Subsequently, from each of the produced positive electrodes of EXAMPLEs 1 to 18 and COMPARATIVE EXAMPLEs 2 and 3, the positive electrode active material was obtained by removing the positive electrode current collector, followed by washing. The obtained positive electrode active material was analyzed for the particle size distribution by a laser diffraction particle size distribution analyzer. As a result, the distributions of the particulate substances A and B were observed.

Because the starting material, namely, the nickel hydroxide A and the nickel hydroxide B, was composed of nearly spherical particles, the nickel hydroxide A and the nickel hydroxide B were assumed to be substantially perfectly spherical. Under this assumption, the weight percentage $W_A$ of the particulate substance A relative to the total of the particulate substance A and the particulate substance B was given by: $W_A (\%)=\{A^3/(A^3+B^3)\}\times 100\alpha$. Herein, the ratio of the number of particles of the particulate substance A to the particulate substance B was taken as $\alpha: (1-\alpha)$, and the average particle sizes of the particulate substances A and B were taken as A and B.

In each example, the weight percentage $W_A$ of the particulate substance A was determined using the obtained particle size distribution and the above equation. As a result, each positive electrode had a weight percentage with a margin of error of only ±2% relative to the weight percentage of the particulate substance A in the starting mixture of the particulate substances A and B.

[Evaluation]
Each of the batteries of EXAMPLEs 1 to 18 and COMPARATIVE EXAMPLEs 1 to 3 was subjected to the following tests.

(Peel Strength of Positive Electrode Active Material Layer)
A sample was obtained by cutting the positive electrode into a strip with a width of 10 mm and a length of 80 mm. The material mixture layer was peeled from the current collector of the sample along the length direction, during which a load necessary for the peeling was measured by a peel force tester. The results are shown in Table 1.

(Defects During Spiral Winding Process)
Prior to being inserted into the bottomed can, the electrode group obtained by the spiral winding process using a winding core having an outer diameter of 3 mm was visually examined from the top for any fracture in the positive electrode. After observing twenty electrode groups for each example, the number of defective electrode groups was counted. The results are shown in Table 1.

(Internal Pressure after Storage)
The electrode group which was not determined as defective in the above test was used to produce a battery. The produced battery was subjected to the following activation in an environment of 20° C.

(i) Charge before Activation (in an environment of 20° C.)
Constant current charge: 1750 mA
End-of-charge voltage: 4.0 V.

(ii) Activation
Left for two days in an environment of 60° C.

(iii) Discharge after Activation (in an environment of 20° C.)
Constant current discharge: 2500 mA
End-of-discharge voltage: 2.5 V.
The following pre-charge/discharge was subsequently performed twice in an environment of 20° C.

(i) Pre-Charge/Discharge
Constant current charge: 1750 mA
End-of-charge voltage: 4.2 V
Constant current discharge: 2500 mA
End-of-discharge voltage: 2.5 V
The following storage test was subsequently performed.

(i) Charge before Storage
Constant current charge: 1750 mA
End-of-charge voltage: 4.2 V (ii) Storage
Stored for three days in an environment of 85° C.

(iii) Internal Pressure Measurement
The battery after storage was naturally cooled down to 20° C., after which gas inside the battery was collected. From the collected amount of gas and the remaining volume in the battery, battery internal pressure was calculated. The results are shown in Table 1.

TABLE 1

|  | Particulate substance A | | Particulate substance B | | | | | | | Number of defects | Internal pressure |
| --- | --- | --- | --- | --- | --- | --- | --- | --- | --- | --- | --- |
|  | Particle size (µm) | Weight ratio (wt %) | Particle size (µm) | Weight ratio (wt %) | Particle size ratio A/B ($D_A/D_B$) | PVDF amount * | Rubber particles | Rubber particle amount * | Peel strength (N/m) | during spiral winding process | after storage (MPa) |
| Ex. 1 | 20 | 70 | 1 | 30 | 20 | 2 | BM-500B | 0.2 | 3.6 | 2 | 0.32 |
| Ex. 2 | 20 | 70 | 3 | 30 | 6.7 | 2 | BM-500B | 0.2 | 4.0 | 0 | 0.31 |
| Ex. 3 | 20 | 70 | 5 | 30 | 4 | 2 | BM-500B | 0.2 | 4.4 | 0 | 0.32 |
| Ex. 4 | 20 | 70 | 10 | 30 | 2 | 2 | BM-500B | 0.2 | 5.2 | 0 | 0.30 |
| Ex. 5 | 10 | 70 | 3 | 30 | 3.3 | 2 | BM-500B | 0.2 | 4.0 | 0 | 0.30 |
| Ex. 6 | 10 | 70 | 5 | 30 | 2 | 2 | BM-500B | 0.2 | 4.2 | 0 | 0.32 |

TABLE 1-continued

|  | Particulate substance A | | Particulate substance B | | | | | | | Number of defects | Internal pressure |
|---|---|---|---|---|---|---|---|---|---|---|---|
|  | Particle size (μm) | Weight ratio (wt %) | Particle size (μm) | Weight ratio (wt %) | Particle size ratio A/B ($D_A/D_B$) | PVDF amount * | Rubber particles | Rubber particle amount * | Peel strength (N/m) | during spiral winding process | after storage (MPa) |
| Ex. 7 | 10 | 70 | 8 | 30 | 1.3 | 2 | BM-500B | 0.2 | 4.4 | 7 | 0.31 |
| Ex. 8 | 20 | 50 | 5 | 50 | 4 | 2 | BM-500B | 0.2 | 4.2 | 0 | 0.31 |
| Ex. 9 | 20 | 80 | 5 | 20 | 4 | 2 | BM-500B | 0.2 | 4.4 | 0 | 0.32 |
| Ex. 10 | 20 | 40 | 5 | 60 | 4 | 2 | BM-500B | 0.2 | 4.0 | 3 | 0.30 |
| Ex. 11 | 20 | 85 | 5 | 15 | 4 | 2 | BM-500B | 0.2 | 4.8 | 2 | 0.31 |
| Ex. 12 | 20 | 70 | 5 | 30 | 4 | 2 | BM-400B | 0.2 | 4.3 | 0 | 0.46 |
| Ex. 13 | 20 | 70 | 5 | 30 | 4 | 2 | SBR | 0.2 | 3.4 | 0 | 0.48 |
| Ex. 14 | 20 | 70 | 5 | 30 | 4 | 0.8 | BM-500B | 0.2 | 2.6 | 0 | 0.31 |
| Ex. 15 | 20 | 70 | 5 | 30 | 4 | 1 | BM-500B | 0.2 | 3.2 | 0 | 0.32 |
| Ex. 16 | 20 | 70 | 5 | 30 | 4 | 3 | BM-500B | 0.2 | 5.6 | 0 | 0.32 |
| Ex. 17 | 20 | 70 | 5 | 30 | 4 | 4 | BM-500B | 0.2 | 6.2 | 2 | 0.30 |
| Ex. 18 | 20 | 70 | 5 | 30 | 4 | 2 | BM-500B | 0.02 | 5.2 | 7 | 0.32 |
| Comp. Ex. 1 | 20 | 100 | — | — | — | 2 | BM-500B | 0.2 | 5.5 | 3 | 0.32 |
| Comp. Ex. 2 | 20 | 70 | 5 | 30 | 4 | 2 | BM-500B | 0.6 | 2.1 | 0 | 0.29 |
| Comp. Ex. 3 | 20 | 70 | 5 | 30 | 4 | 2 | BM-500B | 0.01 | 5.2 | 5 | 0.33 |

* The PVDF amount and the rubber particle amount are expressed in parts by weight relative to the positive electrode active material.

The results are discussed below.

In COMPARATIVE EXAMPLE 1 in which only the particulate substance A was used as the positive electrode active material, the occurrence of defective electrode groups during the spiral winding process was observed. This can be explained as follows. Because the active material of COMPARATIVE EXAMPLE 1 was poor in terms of powder flowability, sufficient flexibility of the positive electrode was not obtained. A distortion hence occurred inside the material mixture layer, which caused a crack to fracture the positive electrode.

In COMPARATIVE EXAMPLE 2 in which a large amount (i.e., a weight percentage of 30% relative to the amount of the PVDF) of rubber particles was contained as the binder, as is evident from Table 1, the peel strength of the material mixture layer was extremely low. Presumably, this is because, due to the excessive amount of the rubber particles, the amount of the PVDF became too small and the crosslinking of the PVDF could not be proceeded sufficiently. In contrast, in COMPARATIVE EXAMPLE 3 in which a very small amount (i.e., a weight percentage of 0.5% relative to the amount of the PVDF) of rubber particles was contained as the binder, the occurrence of defective electrode groups during the spiral winding process was extremely high. This is presumably because the crosslinking of the PVDF proceeded excessively, and thus sufficient flexibility of the material mixture layer was not obtained.

Contrary to COMPARATIVE EXAMPLEs 1 to 3, in EXAMPLEs 2 to 6, 8, 9 and 12 to 16 using the active material composed of two different particulate substances having different average particle sizes at an appropriate weight ratio and an appropriate amount of rubber particles, no fracture was observed in the positive electrodes. In other words, no fracture was caused during the spiral winding process. Moreover, the peel strength was high. The positive electrode material mixture layers of these examples had a satisfactory filling rate of the active material and superior powder flowability. For this reason, even in an area of the spirally wound positive electrodes having a high curvature, the particles could move easily and the flexibility of the material mixture layer was high, so that the positive electrodes were not fractured. In addition, because an appropriate amount of rubber particles were present between the molecules of the PVDF, the crosslinking of the PVDF proceeded properly. It can thus be concluded that the positive electrodes of the present invention had enough flexibility to withstand the spiral winding process as well as sufficient adhesion of the material mixture layer to the current collector.

As is evident from Table 1, in EXAMPLE 7 in which the $D_A/D_B$ ratio of the average particle size of the particulate substance A to the average particle size of the particulate substance B was less than 1.5 and in EXAMPLE 1 in which the $D_A/D_B$ ratio exceeded 7, the fracture of the positive electrode during the spiral winding process was not prevented completely. Presumably, this is because the filling rate of the particulate substances A and B decreased, and in an area of the spirally wound positive electrode having a high curvature, the particles could not move easily, so that the flexibility of the material mixture layer was insufficient. It can thus be concluded that a preferred $D_A/D_B$ ratio is 1.5 to 7.

In EXAMPLE 1 using the particulate substance B having an average particle size of less than 3 μm (specifically, 1 μm), the peel strength was slightly low. This is presumably because the surface area of the active material was large and the amount of the PVDF was not enough. Accordingly, it can be concluded that the particulate substance B preferably has an average particle size of not less than 3 μm.

In EXAMPLE 10 in which the weight percentage $W_A$ of the particulate substance A relative to the total of the particulate substances A and B was less than 50% and in EXAMPLE 11 in which the weight percentage $W_A$ exceeded 80%, the fracture of the positive electrode during the spiral winding process was not prevented completely. This is presumably because the filling rate of the particulate substances A and B decreased, and in an area of the spirally wound positive electrode having a high curvature, the particles could not move easily, so that the flexibility of the material mixture layer was insufficient. It can thus be concluded that the weight percentage $W_A$ of the particulate substance A is preferably 50% to 80%.

In EXAMPLE 18 in which the weight percentage of the rubber particles relative to the amount of the PVDF was 1%, the fracture of the positive electrode during the spiral winding process was not prevented completely. This is presumably because, due to the small amount of the rubber particles, the crosslinking of the PVDF proceeded a little excessively. It can thus be concluded that the weight percentage of the rubber particles relative to the amount of the fluorocarbon resin containing a vinylidene fluoride unit must be 1% to 25%.

With regard to the type of the rubber particles, the use of core-shell rubber particles containing an acrylonitrile unit such as those used in EXAMPLEs 3 and 12 was effective to improve the adhesion between the material mixture layer and the current collector. This is presumably because, due to the core-shell rubber particles having various polar groups in the shell, high adhesion and elasticity were exhibited.

The battery of EXAMPLE 3 which contained BM-500 (core-shell rubber particles containing an acrylonitrile unit and having an acrylate unit incorporated in the shell) had a smaller amount of gas generated after storage than the battery of EXAMPLE 12 which contained BM-400B (core-shell rubber particles containing an acrylonitrile unit and having a styrene unit incorporated in the shell) or the battery of EXAMPLE 13 which contained SBR. This is because the shell of the rubber particles was stable under a positive electrode potential of about 4.2 V. This indicates that when core-shell rubber particles are used as the binder, the shell preferably contains an acrylate unit from the viewpoint of storage characteristics.

In EXAMPLE 14 in which the amount of the PVDF was less than 1 part by weight per 100 parts by weight of the active material, because the crosslinking of the PVDF did not proceed properly, the adhesion of the material mixture layer to the current collector was slightly low. In contrast, in EXAMPLE 17 in which the amount of the PVDF exceeded 3 parts by weight per 100 parts by weight of the active material, the crosslinking of the PVDF was accelerated to facilitate the curing of the material mixture layer. For this reason, the fracture of the positive electrode during the spiral winding process occurred although the occurrence was small. It can thus be concluded that the amount of the PVDF is preferably 1 to 3 parts by weight per 100 parts by weight of the active material.

Investigation 2

Investigation was conducted for the case where the positive electrode active material was crushed during the production of the positive electrode to form a mixture of two different particulate substances having different average particle sizes.

EXAMPLE 19

(i) Production of Positive Electrode

As the starting material of the positive electrode active material, solid solution nickel hydroxide containing a certain amounts of cobalt and aluminum was used. More specifically, solid solution nickel hydroxide having an average particle size of 4 µm and lithium hydroxide were mixed, followed by baking at 950° C. The resulting product was cooled quickly to 100° C. for 30 minutes. Thus, lithium nickel composite oxide secondary particles (average particle size: 12 µm, composition: $LiNi_{0.8}Co_{0.15}Al_{0.05}O_2$) were obtained. This was used as the positive electrode active material.

According to the first step described previously, to 100 parts by weight of the positive electrode active material, 2 parts by weight of PVDF and 0.2 parts by weight of core-shell rubber particles containing an acrylonitrile unit and having an acrylate unit incorporated in the shell were added as the binder. Further, to 100 parts by weight of the active material, 2 parts by weight of acetylene black having an average primary particle size of 0.03 µm as the conductive material and a proper amount of NMP as the dispersing medium were added thereto. Thereby, a positive electrode material mixture slurry was prepared.

The PVDF used here was solid content of KF polymer L #7208 (trade name) available from Kureha Chemical Industry Co., Ltd.

The core-shell rubber particles containing an acrylonitrile unit and having an acrylate unit incorporated in the shell used here were solid content of BM-500B (trade name) available from ZEON CORPORATION.

The positive electrode material mixture slurry was applied onto both surfaces of a 15 µm thick aluminum foil (current collector), followed by drying and rolling to form positive electrode material mixture layers. The thus-produced electrode plate was cut into a size of 56 mm in width and 610 mm in length (56 mm×610 mm). Thereby, a positive electrode was produced. The positive electrode had a porosity of 20%. The total thickness of the aluminum foil and the positive electrode material mixture layers carried on both surfaces of the aluminum foil was 154 µm.

Subsequently, the positive electrode material mixture layer was peeled from the produced positive electrode, followed by washing to obtain only the positive electrode active material. The thus-obtained positive electrode active material was analyzed for the particle size distribution by a laser diffraction particle size distribution analyzer. As a result, it was observed that the particulate substance A composed of lithium nickel composite oxide secondary particles and the particulate substance B composed of lithium nickel composite oxide primary particles which were produced by crushing of the secondary particles during the production process were distributed.

From the obtained particle size distribution, the average particle sizes of the particulate substance A and the particulate substance B were determined. The particulate substance A had an average particle size of 12 µM. The particulate substance B had an average particle size of 3 µm. The weight percentage $W_A$ of the particulate substance A relative to the total of the particulate substance A and the particulate substance B was 75%. The weight percentage $W_A$ was calculated by the equation given previously ($W_A(\%)=\{A^3/(A^3+B^3)\}\times 100\alpha$) using the ratio of the number of particles of the particulate substance A to the particulate substance B and the average particle sizes of the particulate substances A and B under an assumption that the secondary particles were substantially perfectly spherical.

(ii) Production of Negative Electrode

The negative electrode was produced in the same manner as in EXAMPLE 1.

(iii) Assembly of Battery

A battery was assembled in the same manner as in EXAMPLE 1.

The obtained battery was designated as battery of EXAMPLE 19.

EXAMPLES 20 AND 21

Batteries of EXAMPLEs 20 and 21 were produced in the same manner as in EXAMPLE 19 except that the amount of the PVDF serving as the binder for positive electrode was changed to 1 and 3 parts by weight per 100 parts by weight of the positive electrode active material, respectively.

EXAMPLES 22 AND 23

Batteries of EXAMPLEs 22 and 23 were produced in the same manner as in EXAMPLE 19 except that the amount of the rubber particles (solid content of BM-500B) serving as the binder for positive electrode was changed to 0.02 and 0.5 parts by weight (a weight percentage of 1% and 25% relative to the amount of the PVDF) per 100 parts by weight of the positive electrode active material, respectively.

EXAMPLE 24

A battery of EXAMPLE 24 was produced in the same manner as in EXAMPLE 19 except that, instead of the rubber particles of BM-500B, rubber particles of BM-400B (core-shell rubber particles containing an acrylonitrile unit and having a styrene unit incorporated in the shell) were used as the binder for positive electrode.

EXAMPLE 25

A battery of EXAMPLE 25 was produced in the same manner as in EXAMPLE 19 except that, instead of the rubber particles of BM-500B, styrene butadiene rubber (SBR) available under the trade name GRADE 0561 from JSR Corporation was used as the binder for positive electrode.

EXAMPLE 26

A battery of EXAMPLE 26 was produced in the same manner as in EXAMPLE 19 except that the amount of the PVDF was changed to 0.8 parts by weight per 100 parts by weight of the positive electrode active material, and that the amount of the rubber particles (solid content of BM-500B) was changed to 0.1 parts by weight (a weight percentage of 12.5% relative to the amount of the PVDF) per 100 parts by weight of the positive electrode active material.

EXAMPLE 27

A battery of EXAMPLE 27 was produced in the same manner as in EXAMPLE 19 except that the amount of the PVDF serving as the binder for positive electrode was changed to 4 parts by weight per 100 parts by weight of the positive electrode active material.

EXAMPLE 28

A battery of EXAMPLE 28 was produced in the same manner as in EXAMPLE 19 except that the amount of the rubber particles (solid content of BM-500B) was changed to 0.1 parts by weight (a weight percentage of 5% relative to the amount of the PVDF) per 100 parts by weight of the positive electrode active material.

COMPARATIVE EXAMPLE 4

A battery of COMPARATIVE EXAMPLE 4 was produced in the same manner as in EXAMPLE 19 except that, in the production of the positive electrode active material, the cooling time for the lithium nickel composite oxide was changed from 30 minutes to 12 hours (i.e., slow cooling was performed).

COMPARATIVE EXAMPLE 5

A battery of COMPARATIVE EXAMPLE 5 was produced in the same manner as in EXAMPLE 19 except that only the PVDF was used (i.e., the rubber particles were not used).

COMPARATIVE EXAMPLES 6 AND 7

Batteries of COMPARATIVE EXAMPLEs 6 and 7 were produced in the same manner as in EXAMPLE 19 except that the amount of the rubber particles (solid content of BM-500B) was changed to 0.6 and 0.01 parts by weight (a weight percentage of 30% and 0.5% relative to the amount of the PVDF) per 100 parts by weight of the positive electrode active material, respectively.

The positive electrode active materials were obtained by peeling the positive electrode material mixture layers from the produced positive electrodes of EXAMPLEs 20 to 28 and COMPARATIVE EXAMPLEs 5 to 7, followed by washing. Each of the obtained positive electrode active materials was analyzed for the particle size distribution by a laser diffraction particle size distribution analyzer. As a result, similar to EXAMPLE 19, it was observed that the particulate substance A composed of lithium nickel composite oxide secondary particles and the particulate substance B composed of lithium nickel composite oxide primary particles which were produced by crushing of the secondary particles during the production process were distributed.

From the obtained particle size distribution, the average particle sizes of the particulate substance A and the particulate substance B were determined. Similar to EXAMPLE 19, the particulate substance A had an average particle size of 12 µm. The particulate substance B had an average particle size of 3 µm. The weight percentage $W_A$ of the particulate substance A relative to the total of the particulate substance A and the particulate substance B was 75%.

In COMPARATIVE EXAMPLE 4, only the secondary particles were observed in the particle size distribution. The secondary particles had an average particle size of 12 µm.

[Evaluation]

The batteries of EXAMPLEs 19 to 28 and COMPARATIVE EXAMPLEs 4 to 7 were evaluated in terms of peel strength of the positive electrode material mixture layer, defects during spiral winding process and internal pressure after storage in the same manner described previously. The results are shown in Table 2.

TABLE 2

| | Particulate substance A | | Particulate substance B | | | | | | | Number of defects | Internal pressure |
|---|---|---|---|---|---|---|---|---|---|---|---|
| | Particle size (µm) | Weight ratio (wt %) | Particle size (µm) | Weight ratio (wt %) | Particle size ratio A/B ($D_A/D_B$) | PVDF amount * | Rubber particles | Rubber particle amount * | Peel strength (N/m) | during spiral winding process | after storage (MPa) |
| Ex. 19 | 12 | 75 | 3 | 25 | 4 | 2 | BM-500B | 0.2 | 4.0 | 0 | 0.32 |
| Ex. 20 | 12 | 75 | 3 | 25 | 4 | 1 | BM-500B | 0.2 | 2.9 | 0 | 0.31 |
| Ex. 21 | 12 | 75 | 3 | 25 | 4 | 3 | BM-500B | 0.2 | 5.1 | 1 | 0.33 |

TABLE 2-continued

|  | Particulate substance A | | Particulate substance B | | | | | | | Number of defects | Internal pressure |
|---|---|---|---|---|---|---|---|---|---|---|---|
|  | Particle size (μm) | Weight ratio (wt %) | Particle size (μm) | Weight ratio (wt %) | Particle size ratio A/B ($D_A/D_B$) | PVDF amount * | Rubber particles | Rubber particle amount * | Peel strength (N/m) | during spiral winding process | after storage (MPa) |
| Ex. 22 | 12 | 75 | 3 | 25 | 4 | 2 | BM-500B | 0.02 | 5.4 | 2 | 0.32 |
| Ex. 23 | 12 | 75 | 3 | 25 | 4 | 2 | BM-500B | 0.5 | 3.1 | 0 | 0.30 |
| Ex. 24 | 12 | 75 | 3 | 25 | 4 | 2 | BM-400B | 0.2 | 3.9 | 0 | 0.46 |
| Ex. 25 | 12 | 75 | 3 | 25 | 4 | 2 | SBR | 0.2 | 3.1 | 0 | 0.48 |
| Ex. 26 | 12 | 75 | 3 | 25 | 4 | 0.8 | BM-500B | 0.1 | 2.4 | 0 | 0.31 |
| Ex. 27 | 12 | 75 | 3 | 25 | 4 | 4 | BM-500B | 0.2 | 5.6 | 3 | 0.36 |
| Ex. 28 | 12 | 75 | 3 | 25 | 4 | 2 | BM-500B | 0.1 | 4.5 | 0 | 0.31 |
| Comp. Ex. 4 | 12 | 100 | — | — | — | 2 | BM-500B | 0.2 | 5.4 | 14 | 0.30 |
| Comp. Ex. 5 | 12 | 75 | 3 | 25 | 4 | 2 | — | — | 5.7 | 18 | 0.30 |
| Comp. Ex. 6 | 12 | 75 | 3 | 25 | 4 | 2 | BM-500B | 0.6 | 1.9 | 0 | 0.29 |
| Comp. Ex. 7 | 12 | 75 | 3 | 25 | 4 | 2 | BM-500B | 0.01 | 4.7 | 8 | 0.33 |

* The PVDF amount and the rubber particle amount are expressed in parts by weight relative to the positive electrode active material.

The results are discussed below.

In COMPARATIVE EXAMPLE 4 in which the active material was prepared by slowly cooling it after baking, the occurrence of defective electrode groups during the spiral winding process was considerable. It is surmised that the distortion inside the positive electrode active material was reduced by the slow cooling so that the positive electrode active material was not crushed even when an external stress was applied. For this reason, the secondary particles remained without being crushed in the produced positive electrode. The reason why the positive electrode easily fractured is presumably due to poor flexibility of the material mixture layer. Specifically, during the spiral winding process, the particles could not move easily in the innermost area of the positive electrode having a high curvature, which caused a distortion inside the material mixture layer to induce a crack.

In COMPARATIVE EXAMPLE 5 in which the rubber particles serving as the binder were not used, the occurrence of defective electrode groups during the spiral winding process was extremely high. Presumably, this is because the rubber particles were not used so that nothing inhibited the crosslinking of the PVDF and the curing of the material mixture layer proceeded significantly.

Contrary to these comparative examples, in EXAMPLEs of the present invention in which the active material was cooled quickly and both the PVDF and the rubber particles were contained as the binder, the occurrence of defective electrode groups was rare. In EXAMPLEs 19, 20, 23 to 26 and 28, in particular, the occurrence was zero. It is surmised that, in the active materials of EXAMPLEs of the present invention, the distortion inside the positive electrode active material was large due to the quick cooling so that the positive electrode active material was easily crushed by an external stress. In the produced positive electrode, therefore, the primary particles and the secondary particles were mixed to form a mixture, which allowed the particles to move easily even in an area having a high curvature, whereby flexibility was imparted to the material mixture layer. For this reason, the positive electrode was not fractured. In addition, because an appropriate amount of rubber particles were present between the molecules of the PVDF, the crosslinking of the PVDF was facilitated properly, so that the positive electrode had sufficient adhesion of the positive electrode material mixture layer to the current collector and at the same time flexibility enough to withstand the spiral winding process.

In COMPARATIVE EXAMPLE 6 in which the weight percentage of the rubber particles relative to the PVDF exceeded 25 wt %, the adhesion of the positive electrode material mixture layer to the current collector was extremely low. This is presumably because the excessively large amount of the rubber particles caused insufficient crosslinking of the PVDF. In contrast, in COMPARATIVE EXAMPLE 7 in which the weight percentage of the rubber particles relative to the PVDF was below 1 wt %, the occurrence of defective electrode groups during the spiral winding process was not prevented. This is presumably because the crosslinking of the PVDF did not proceed properly due to the excessively small amount of the rubber particles. It can thus be concluded that the weight percentage of the rubber particles relative to the amount of the fluorocarbon resin containing a vinylidene fluoride unit must be 1% to 25%.

With regard to the type of the rubber particles, the use of core-shell rubber particles containing an acrylonitrile unit such as those used in EXAMPLEs 19 and 24 improved the adhesion of the material mixture layer to the current collector to a large extent, as compared to EXAMPLE 25 in which SBR was used. This is presumably because, due to the core-shell rubber particles having various polar groups in the shell, high adhesion and elasticity were exhibited.

The battery of EXAMPLE 19 which contained BM-500B (core-shell rubber particles containing an acrylonitrile unit and having an acrylate unit incorporated in the shell) had a smaller amount of gas generated after storage than the battery of EXAMPLE 24 which contained BM-400B (core-shell rubber particles containing an acrylonitrile unit and having a styrene unit incorporated in the shell) or the battery of EXAMPLE 25 which contained SBR. This is because the shell of the rubber particles was stable under a positive electrode potential of about 4.2 V. This indicates that when core-shell rubber particles are used as the binder, the shell preferably contains an acrylate unit from the viewpoint of storage characteristics.

In EXAMPLE 26 in which the amount of the PVDF was less than 1 part by weight per 100 parts by weight of the active material, because the crosslinking of the PVDF did not proceed properly, the adhesion of the material mixture layer was slightly low. In contrast, in EXAMPLE 27 in which the amount of the PVDF exceeded 3 parts by weight per 100 parts by weight of the active material, the crosslinking of the PVDF was accelerated to facilitate the curing of the material mixture layer. For this reason, the fracture of the positive electrode during the spiral winding process occurred although the occurrence was small. It can thus be concluded that the amount of the PVDF is preferably 1 to 3 parts by weight per 100 parts by weight of the active material.

The present invention is intended to enhance the productivity of high capacity non-aqueous electrolyte secondary batteries having a positive electrode active material including a lithium composite metal oxide containing nickel as an essential element. According to the present invention, it is possible to impart flexibility to the positive electrode material mixture layer by using a positive electrode active material including a mixture composed of two different particulate substances having different average particle sizes, and at the same time to impart appropriate adhesion with the current collector to the positive electrode material mixture layer, so that the occurrence of defective electrode groups can be reduced dramatically.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising an electrode group in which a positive electrode and a negative electrode are spirally wound with a separator interposed therebetween, said positive electrode comprising a positive electrode active material and a binder, said positive electrode active material comprising a mixture composed of two different particulate substances having different average particle sizes, said two different particulate substances each comprising a lithium composite metal oxide containing nickel as an essential element, said binder comprising fluorocarbon resin and particulate rubber particles, and said fluorocarbon resin comprising at least a vinylidene fluoride unit, wherein the amount of said rubber particles per 100 parts by weight of said fluorocarbon resin is 5 to 25 parts by weight, said mixture composed of two different particulate substances comprises a particulate substance A and a particulate substance B, and a ratio: $D_A/D_B$ of the average particle size of said particulate substance A ($D_A$) to the average particle size of said particulate substance B ($D_B$) is 1.5 to 7, the weight percentage of said particulate substance A relative to said mixture composed of two different particulate substances is 50% to 80%, and the amount of said fluorocarbon resin is 1 to 3 parts by weight relative to 100 parts by weight of said positive electrode active material.

2. The non-aqueous electrolyte secondary battery in accordance with claim 1, wherein said particulate substance A has an average particle size of 10 μm to 20 μm and said particulate substance B has an average particle size of 3 μm to 10 μm.

3. The non-aqueous electrolyte secondary battery in accordance with claim 1, wherein said rubber particles are core-shell rubber particles containing an acrylonitrile unit.

4. The non-aqueous electrolyte secondary battery in accordance with claim 3, wherein said core-shell rubber particles comprise an acrylate unit in the shell.

5. The non-aqueous electrolyte secondary battery in accordance with claim 1, wherein said mixture composed of two different particulate substances is a mixture of primary particles and secondary particles of said lithium composite metal oxide.

6. The non-aqueous electrolyte secondary battery in accordance with claim 1, wherein said rubber particles have an average particle size of 0.05 to 0.5 μm.

* * * * *